April 18, 1933.    G. B. PRATT    1,904,902
FLASH LIGHT
Filed Aug. 16, 1930    2 Sheets-Sheet 2
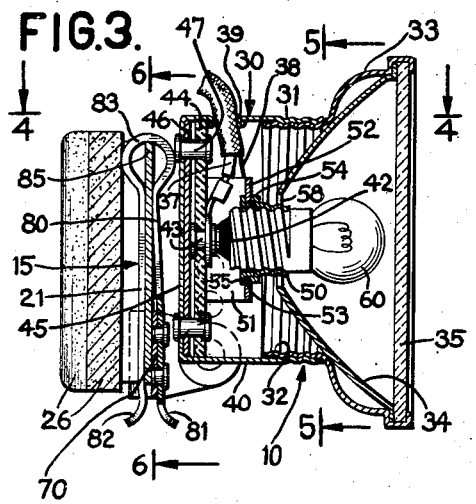
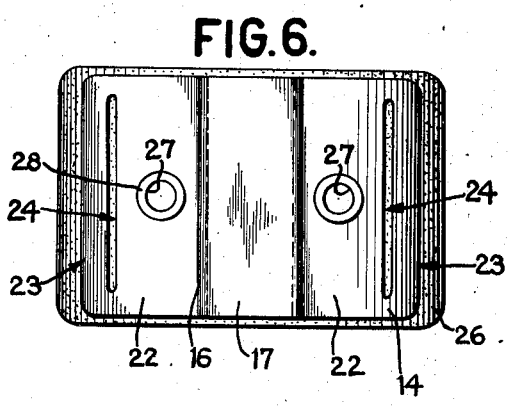
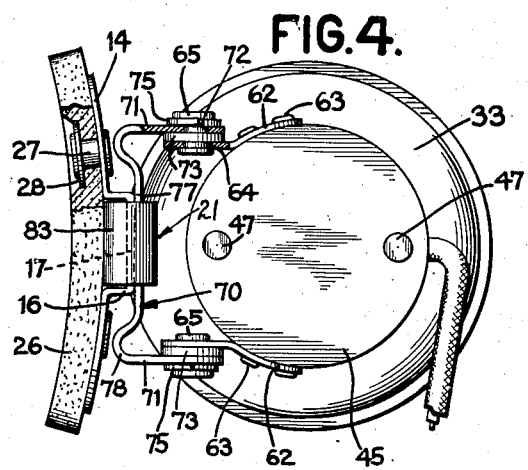
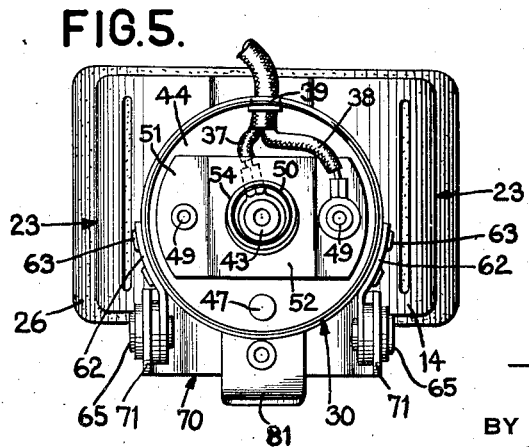
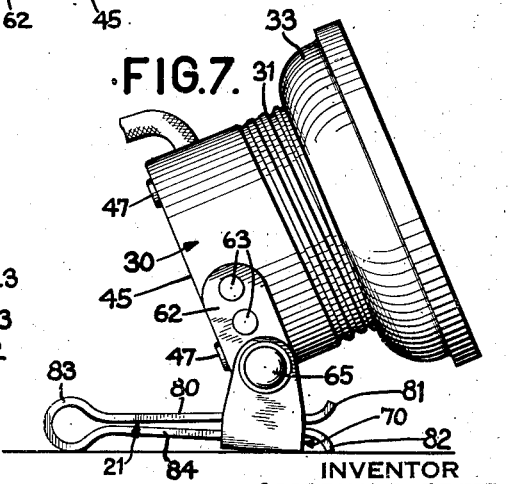
INVENTOR
GOODRICH B. PRATT
BY ATTORNEYS
Bohleber & Leadbetter Patented Apr. 18, 1933

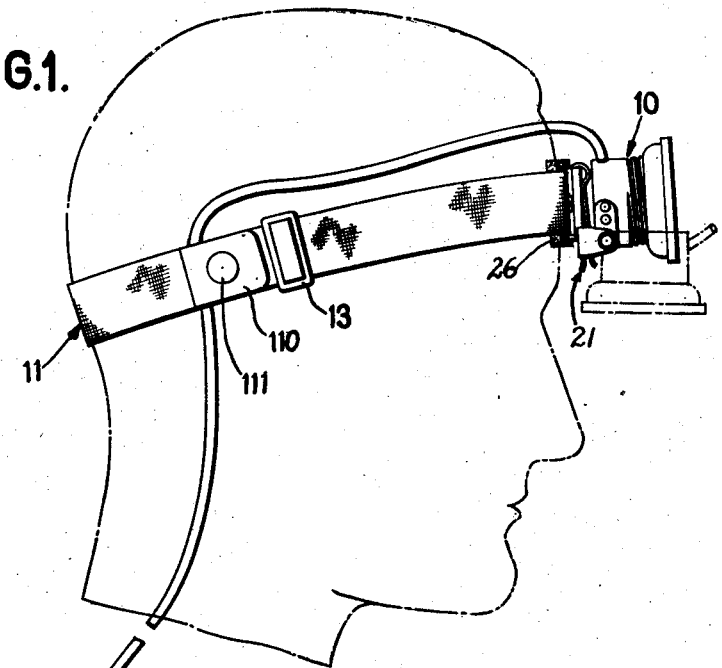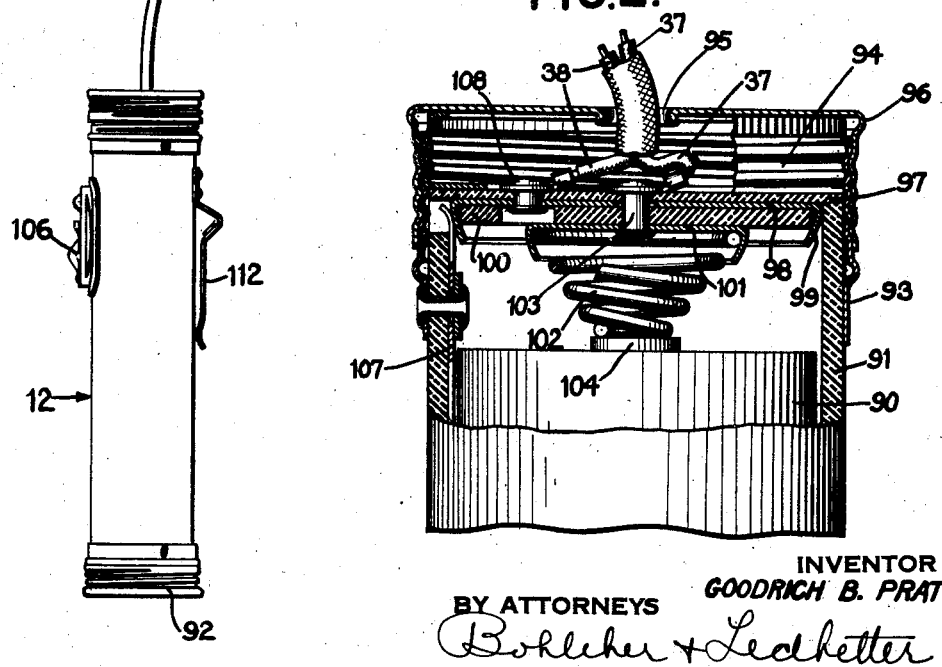

1,904,902

UNITED STATES PATENT OFFICE

GOODRICH B. PRATT, OF GRANTWOOD, NEW JERSEY, ASSIGNOR TO BOND ELECTRIC CORPORATION, OF JERSEY CITY, NEW JERSEY, A CORPORATION OF DELAWARE

FLASH LIGHT

Application filed August 16, 1930. Serial No. 475,655.

This invention relates broadly to portable electric lamps or lanterns. More particularly, the invention relates to that type of electric lamp in which the source of light is adapted to be carried on the head or cap of the user or other convenient place while the source of electric current, say a battery, is carried on the belt or in the pocket.

One object of the invention is a lamp which is adjustable with respect to mounting means so that the rays of light may be directed at different angles, as desired, in a vertical plane.

Another object of the invention is the provision of such a lamp which is capable of adjustment through an angle of ninety degrees or more.

It is also an object of the invention to provide novel and improved adjusting means whereby the lamp may be held at any position throughout its range of adjustment.

The invention also seeks mounting means for the lamp on the head or cap which may be worn without inconvenience.

Still another object of the invention is the provision of adjustable means which not only will cooperate with such mounting means but will also serve as a base for the lamp when stood upon a surface, such as a table or the like.

The invention also has for its object a lamp of the character described which may be focused upon the object to be illuminated.

Yet another object of the invention is an electric lamp construction which is practical from the standpoint of ease and cheapness of manufacture and convenience and durability in use.

These and other objects of the invention and the means for their attainment will be more apparent from the following detailed description taken in connection with the accompanying drawings, illustrating one embodiment by which the invention may be realized, and in which:

Figure 1 is a view showing, in side elevation, the electric lamp of this invention in use.

Figure 2 is a view, in longitudinal transverse section, showing the upper end of a battery containing casing.

Figure 3 is a view showing, in vertical section, the source of light and its mounting means, in accordance with this invention.

Figure 4 is a view of the structure shown in Figure 3, looking from above, but showing the lamp rotated downwardly through ninety degrees, a portion being in section to show its construction.

Figure 5 is a view showing the lamp with the reflector and lens removed looking from the right of Figure 3 and taken on the line 5—5 of that figure to show the lamp socket and support therefor.

Figure 6 is a view showing the mounting means for the lamp, in front elevation, taken on the line 6—6 of Figure 3.

Figure 7 shows the lamp standing upon a flat surface.

As seen in Figure 1 the electric lamp of this invention comprises, generally, three parts, to wit, the lamp proper 10, the head band 11, upon which it is removably carried, and the source of electric current 12. This head band 11 may be disposed, say, on the wearer's forehead and the lamp 10 adjusted so the light shines upon any surface to be viewed or examined. The head band 11 may be of fabric or other suitable material, such as elastic webbing, adjustable as by the slide 13 and provided with mounting means to be worn say at the front of the wearer's head. This mounting means consists generally of a plate or sheet of metal 14, Figure 6, somewhat flexible, if desired, conveniently of substantially rectangular form and having its central portion between the shorter edges offset in the form of a rectangular three sided groove 15 formed by the outwardly extending sides 16 and the front wall 17. The groove 15 serves to receive a cooperating part or spring clip 21 on the lamp 10 as will be more apparent hereinafter. From the sides 16 of the groove the ends 22 of the plate are conveniently curved or bent rearwardly to conform to the head of the wearer and, adjacent the shorter edges 23, are slotted, as at 24, to receive the head band 11. In order that the mounting means may rest comfortably on the head of the wearer, the plate 14 carries cushioning means rearwardly thereof. As illustrated this takes the form of a resilient or yielding pad 26 of non-metallic material, such as sponge rubber, which is conveniently secured to the plate 14 by the eyelets or rivets 27, say one on each side of the groove 15, the eyelets 27 being prevented from tearing out of the pad, say by washers 28 or the like which may be formed of fibrous material.

The source of illumination or lamp proper (10) consists generally of a cup-shaped housing or box 30 of suitable material such as metal formed with threads 31 around its edge to receive the companion threads 32 of the hood 33 containing the reflector 34 and lens 35, the reflector 34, lens 35 and hood 33 being preferably so united as to be permanently held together although it will be obvious that any well known means of assembly may be adopted. The lead-in wires 37, 38 bringing the electric current to the lamp enter the box 30 through a hole 39 formed in the wall 40 thereof, the lead-in wire 37 for connection with the central terminal 42 of the lamp base being secured, say, by a rivet 43 or eyelet with which the terminal 42 contacts, which eyelet 43 is centrally disposed in an insulating disc 44 and insulated from the bottom 45 of the box 30 by a second disc 46 between the first mentioned disc 44 and the bottom 45 of the cup 30. Both these discs 44 and 46 are held in position to the bottom 45 of the box 30 by rivets 47. The lamp socket 50 is concentric with the contact rivet 43 but is spaced therefrom by being mounted on a lamp socket support 51 comprising a plate or strip of metal offset between its ends to form the raised central portion 52, rectangular in cross-section. The raised portion 52 is apertured at 53 to receive the lamp socket 50 which is formed with a flange 54 pressed outwardly around its periphery to rest on the edge of the hole 53 in the lamp socket support 52, the inner end of the socket 50 being then upset as at 55 to clamp the two parts together. The lamp socket support 51 is secured to the contact supporting disc 44 as by rivets or eyelets 49 which are disposed in a line at right angles, say, to the rivets 47 holding the lamp socket supporting disc 44 to the bottom 45 of the box 30. The lead-in wire 38 for the lamp socket 50 may conveniently be secured in electrical connection with one of the securing rivets 49 of the lamp socket support 52.

It will be noted that the lamp socket 50 is disposed not only centrally of the cup-shaped box 30 but also well up toward its rim and that the reflector 34 is formed with a hole 58 of a diameter greater than the diameter of the lamp socket 50 and in fact greater than the transverse diameter of the lamp bulb 60 so that upon moving the hood 33 relative to the housing 30, as by screwing it thereto or unscrewing it therefrom, the incandescent filament of the lamp 60 may be brought into the desired focal point of the reflector 34 and the light thus focused as desired.

On the side or wall 40 of the box 30, adjacent the bottom 45, are mounted brackets 62, say by riveting as at 63 and these brackets 62 are formed with holes 64 through which pivot pins 65 or the like pass by which the lamp is adjustably mounted on its support. The support comprises a frame 70 formed from a strip of metal, as seen best in Figures 3, 4 and 5, bent up at its ends into arms 71, the arms 71 being apertured as at 72 to receive the pivot pins 65. Preferably the pivot pins 65 take the form of rivets passing through the holes 64, 72 in both the bracket 62 and the arm 71 of the frame 70. Between each apertured bracket 62 and apertured arm 71 is preferably disposed a washer 73 of non-metallic material which not only prevents wear between the metallic parts but serves to assist, by the friction set up, in holding the brackets 62 in adjusted relation to the arms 71. Also to promote this friction, lock washers or spring members 75 are inserted between say the ends or heads of the pins 65 and the arms 71 to take up all play between the parts and press the arms against the friction washers 75. Between the arms 71 the frame is offset inwardly as at 77 forming adjacent the arms foot rests or legs 78 upon which the frame 70 may stand as shown in Figure 7. Midway between the arms and inwardly of the frame there is secured one arm 80 of a hairpin-shaped spring clip 21 the ends 81, 82 of which diverge and the reversely bent portion is formed of generally cylindrical shape as at 83 to increase the resiliency with which the two legs 80, 84 are pressed together. The spring clip 21 is relatively narrow, the width of the leg portion 80 and 84 being just sufficient to be received, as a slide, in the slot 15 in the support without side play, while as shown in Figure 3, the turned over part or bend 83 rests upon the top edge 85 of the groove 15 and the spring clip grips the bottom 17 of the groove tightly. When the lamp 10 is removed from the head band 11 and stood up on a flat surface, as shown in Figure 7, the spring clip 21 and frame 70 form a base, as shown, and the lamp 10 may be adjusted at any angle about the pivot pins 65 to direct the light as desired.

The source of electric current is illustrated as a battery of cells 90 contained within a container 12 adapted to be supported in any convenient manner and from which the lead-in wires extend to the lamp. As shown, the container takes the form of a cylindrical flashlight casing 91, one end of which is closed by any convenient form of removable bottom cap 92. The opposite end of the casing 91 carries a threaded collar 93 and within this threaded collar there is disposed a contact member which is held on to the end of the casing 91 by a removable threaded annulus 94. The wires lead from this contact member through a hole 95 in a cap 96 threaded over the outside of the threaded collar 93.

The contact member comprises a supporting disc 97 of non-metallic material of substantially the same diameter as the outside diameter of the tubular casing 91. This disc 97 rests upon the end of the casing 91 within the collar 93. Secured to the bottom face of the supporting disc 97 is a metallic disc-like conducting member 98 having a peripheral inwardly directed flange 99 which forms a tapered contact surface. Within the contact flange 99 and, if desired, held in thereby, is another disc 100. also of non-metallic material, which insulates a metallic cup-shaped holding member 101 for a yielding contact 102 for the battery. As shown a coil spring 102 is held within the holding member 101. The holding member 101 is secured to the support by a rivet 103 or eyelet which passes through all the discs 97, 98, 100, 101, but out of contact with the metallic contact disc 98 as by passing through an oversize hole therein. Thus, current flowing from the positive pole 104 of the cell 90, passes through the contact spring 102, holding cup 101 and conducting rivet 103 to the wire 37. From the negative pole of the battery the circuit is completed by the bottom cap 92, a conductor strip, not shown, leading to the circuit closer or switch 106 and, when the switch is closed, through the conductor strip 107 to the contact flange 99 of the metal conducting disc 98 with which the wire 38 is connected by the terminal rivet 108.

The use of the portable lamp in accordance with this invention is shown in Figure 1. The flexible head band 11 is shown encircling the head of the user and adjusted to fit, i. e., enlarged or made smaller by the slide 13, so that the lamp is retained, say, above the eyes and the yielding pad 26 cushions the forehead. The lamp 10 may be adjusted about the pivot pins 65 to direct the light to the desired spot, it being held in the adjusted position by the friction between the frame 70 and brackets 62. The wire 37, 38 is shown carried back over the head and retained there by a flap 110 on the head band 11 held about the wire by a snap fastener 111, or the like. The wire leads downwardly to the battery container 12 which may be carried in the pocket or secured on the belt by means say of the clip 112. When light is desired, the lamp is illuminated by operating the switch 106.

It will thus be seen that a portable electric lamp has been provided which is capable of use not only on a head band, but also which can be removed therefrom and stood on a surface in order to illuminate a desired area. In either situation the lamp is adjustable with respect to its supporting means.

Various modifications will occur to those skilled in the art in the disposition, composition and configuration of the component elements going to make up the invention as a whole as well as in the selection and use of one or more of the elements independently or in combination with each other, and no limitation is intended by the phraseology of the foregoing description or illustrations in the accompanying drawings, except as indicated in the appended claims.

What is claimed is:

1. In a portable electric lamp, in combination, an adjustable head band, a plate formed with slots proximate opposite edges, respectively, for the reception of the head band, the mid-portion of said plate being offset to form a groove rectangular in cross-section, a pad of yielding non-metallic material secured to the plate on the side opposite to the groove, and a lamp comprising a housing, apertured brackets carried with the housing, a base comprising a frame formed with spaced, parallel apertured arms, and formed, in a direction opposite to the arms, with spaced foot portions, and a reversely bent spring clip having parallel arms yieldingly pressed together, one arm being secured to the frame between the arms and the other arm being adapted for reception in the groove on the head band.

2. In a portable electric lamp, in combination, an adjustable head band, a plate formed with slots proximate opposite edges, respectively, for the reception of the head band, the mid-portion of said plate being offset to form a groove rectangular in cross-section, and extending in parallel relationship to the slots, a pad of yielding non-metallic material secured to the plate on the side opposite to the groove, means carried with the head band to releasably secure the wires, and a lamp comprising a housing, apertured brackets carried with the housing, a base comprising a frame formed with spaced, parallel apertured arms, and formed, in a direction opposite to the arms, with spaced foot portions, and a reversely bent spring clip having parallel arms yieldingly pressed together, one arm being secured to the frame between the arms and the other arm being adapted for reception in the groove on the head band, pivot pins passing through the said aperture, a friction washer on each pivot pin between an arm and a bracket and spring means on the pins, respectively, between the heads thereof and the arms.

3. In a portable electric lamp, in combination, a head band, a plate carried therewith, a portion of said plate being offset to form a groove and a lamp comprising a housing, brackets carried with the housing, a base comprising a frame formed with arms, connections between the arms and brackets, respectively, and a reversely bent spring clip having parallel arms yieldingly pressed together, one arm being secured to the frame between the frame arms and the other arm being adapted for reception in the groove on the head band.

4. In a portable electric lamp, in combination, a head band, means carried therewith having a groove, a lamp comprising a housing and a base comprising a frame, pivotal connections between the frame and the lamp housing, said frame comprising a slide having a slidable fit in the groove for removable retention therein and laterally extending portions forming with the slide a base on which the lamp may stand when removed from the head band.

In testimony whereof I affix my signature.

GOODRICH B. PRATT.